(12) United States Patent
Leinfellner et al.

(10) Patent No.: US 12,380,251 B2
(45) Date of Patent: *Aug. 5, 2025

(54) AUTHENTICATION OF MEDICAL DEVICE COMPUTING SYSTEMS BY USING METADATA SIGNATURE

(71) Applicant: Fresenius Medical Care Holdings, Inc., Waltham, MA (US)

(72) Inventors: Norbert Leinfellner, Livermore, CA (US); Joseph Edwin Inase Manakkil, San Ramon, CA (US); Paolo Pochendorfer, Pleasanton, CA (US)

(73) Assignee: Fresenius Medical Care Holdings, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,509

(22) Filed: Apr. 24, 2024

(65) Prior Publication Data

US 2024/0346185 A1    Oct. 17, 2024

Related U.S. Application Data

(63) Continuation of application No. 18/344,003, filed on Jun. 29, 2023, now Pat. No. 11,995,221, which is a
(Continued)

(51) Int. Cl.
*G06F 21/73* (2013.01)
*G06F 21/70* (2013.01)
(Continued)

(52) U.S. Cl.
CPC .............. *G06F 21/73* (2013.01); *G06F 21/70* (2013.01); *G06F 21/71* (2013.01); *G06F 21/76* (2013.01);
(Continued)

(58) Field of Classification Search
CPC .......... G06F 21/73; G06F 21/70; G06F 21/71; G06F 21/57; G06F 21/575; G06F 21/30;
(Continued)

(56) References Cited

U.S. PATENT DOCUMENTS 6,308,089 B1    10/2001    von der Ruhr et al.
2010/0275063 A1    10/2010    Walmsley et al.
(Continued)

FOREIGN PATENT DOCUMENTS

CN    101146261    3/2008
CN    102158863    8/2011
(Continued)

OTHER PUBLICATIONS

International Preliminary Report on Patentability in International Appln. No. PCT/US2020/048484, mailed Mar. 17, 2022, 10 pages.
(Continued)

*Primary Examiner* — Shaqueal D Wade-Wright
(74) *Attorney, Agent, or Firm* — Fish & Richardson P.C.

(57) ABSTRACT

Computer code embedded in an electronic component a medical device, such as a dialysis machine, can be authenticated by comparing a metadata signature derived from the computer code of the electronic component to a key derived from a pre-authenticated code associated with the electronic component. The metadata signature can be derived by running an error-check/error-correct algorithm (e.g., SHA256) on the computer code of the electronic component. A use of the metadata signature enables detection of any unauthorized changes to the computer code as compared to the pre-authenticated code.

20 Claims, 9 Drawing Sheets

Related U.S. Application Data continuation of application No. 17/399,209, filed on Aug. 11, 2021, now Pat. No. 11,727,155, which is a continuation of application No. 16/560,534, filed on Sep. 4, 2019, now Pat. No. 11,126,752.

(51) Int. Cl.
| | | |
|---|---|---|
| *G06F 21/71* | (2013.01) | |
| *G06F 21/76* | (2013.01) | |
| *H04L 9/08* | (2006.01) | |
| *H04L 9/14* | (2006.01) | |
| *G06F 21/30* | (2013.01) | |
| *G06F 21/57* | (2013.01) | |
| *H04L 9/40* | (2022.01) | |

(52) U.S. Cl.
CPC .......... *H04L 9/0819* (2013.01); *H04L 9/0861* (2013.01); *H04L 9/0894* (2013.01); *H04L 9/14* (2013.01); *G06F 21/30* (2013.01); *G06F 21/57* (2013.01); *H04L 9/0866* (2013.01); *H04L 63/0876* (2013.01)

(58) Field of Classification Search
CPC ...... G06F 21/305; G06F 21/44; G06F 21/604; G06F 21/65; G06F 21/645; H04L 9/08; H04L 9/0819; H04L 9/0861; H04L 9/0894; H04L 9/14; H04L 9/0866; H04L 9/32; H04L 9/3226; H04L 9/0858; H04L 9/0891; H04L 9/3247; H04L 9/3249; H04L 9/3252; H04L 2209/34; H04L 63/08; H04L 63/0876; H04L 63/083; H04L 63/062

See application file for complete search history.

(56) References Cited

U.S. PATENT DOCUMENTS

| | | |
|---|---|---|
| 2011/0081888 A1 | 4/2011 | Waniss |
| 2011/0299679 A1 | 12/2011 | Yamaguchi et al. |
| 2012/0272052 A1 | 10/2012 | Wichmann et al. |
| 2017/0024568 A1 | 1/2017 | Pappachan et al. |
| 2018/0114220 A1 | 4/2018 | Ekberg |
| 2019/0036688 A1 | 1/2019 | Wasily et al. |
| 2019/0102533 A1* | 4/2019 | Sagar ...................... G06F 21/85 |
| 2019/0163910 A1* | 5/2019 | Moon ..................... G06F 21/54 |
| 2019/0238555 A1 | 8/2019 | Buffard et al. |
| 2020/0153636 A1 | 5/2020 | Takada et al. |
| 2020/0169414 A1 | 5/2020 | Ekdahl et al. |
| 2021/0334378 A1 | 10/2021 | Kennedy et al. |
| 2022/0021518 A1* | 1/2022 | Geater .................. H04L 9/3247 |

FOREIGN PATENT DOCUMENTS

| | | |
|---|---|---|
| CN | 102473230 | 5/2012 |
| CN | 104601579 | 5/2015 |
| CN | 108432180 | 8/2018 |
| CN | 108476133 | 8/2018 |
| CN | 109326337 | 2/2019 |
| WO | WO 2017/083071 | 5/2017 |
| WO | WO 2017/100217 | 6/2017 |

OTHER PUBLICATIONS

International Search Report and Written Opinion in International Appln. No. PCT/US2020/048484, mailed Nov. 9, 2020, 15 pages.

\* cited by examiner

AUTHENTICATION OF MEDICAL DEVICE COMPUTING SYSTEMS BY USING METADATA SIGNATURE

CROSS-REFERENCE TO RELATED APPLICATIONS

This application is a continuation of U.S. application Ser. No. 18/344,003, filed on Jun. 29, 2023, which is a continuation of U.S. application Ser. No. 17/399,209, filed on Aug. 11, 2021, now U.S. Pat. No. 11,727,155, which claims priority to U.S. application Ser. No. 16/560,534, filed on Sep. 4, 2019, now U.S. Pat. No. 11,126,752.

TECHNICAL FIELD

This invention relates to authentication of electronic components of a computing system, such as a computing system of a medical device.

BACKGROUND

Data security is critical in computing systems. This is especially true for medical devices, such as dialysis machines including peritoneal dialysis machines and hemodialysis machines. Official administrations such as the US Food and Drug Administration (FDA) require a high level of cybersecurity for medical and drug delivery devices. An unauthorized manipulation of the code of such medical devices can severely jeopardize data security of those devices.

SUMMARY

Implementations of the present disclosure include computer-implemented methods for validation and authentication of computer systems that include multiple programmable sub-system (e.g., PCB) and/or electronic components (e.g., processors, sensors, FPGA, etc.). For example, the implementations provide techniques to validate and authenticate the computer codes of multi-processor dialysis machines.

In some implementations, the computer-implemented method includes: requesting, by a security authentication engine (SAE) of a computing system and from an electronic component of the computing system, a metadata signature specific to the electronic component, receiving, by the SAE, the metadata signature from the electronic component, encrypting, by the SAE, the metadata signature to generate a first encrypted metadata, and determining, by the SAE, that the first encrypted metadata substantially matches a first key associated with the electronic component and stored in the SAE, and in response providing, by the SAE, the first key to the electronic component as a validation key to be used by the electronic device in communications with other electronic components of the computing system. The metadata signature is derived from an error-check/error-correct code paired with a computer code embedded in the electronic component.

The first key can be stored in a lookup table. The lookup table includes a plurality of keys; each key of the plurality of keys is associated with a respective electronic component of the computing system.

The first key can be part of a key pair associated with the electronic component. The key pair includes a second key. The SAE can request the metadata signature by sending a message that includes the second key to the electronic component. In some implementations, the metadata signature is generated by decrypting the second key based the computer code embedded in the electronic component.

The computing system can include a plurality of subsystems and the electronic component resides on a first subsystem of the plurality of subsystems. The SAE can request the metadata signature in response to determining that the first subsystem is a valid subsystem of the computing system.

In some implementations, determining that the first subsystem is a valid system includes: receiving, by the SAE and from the electronic component, a first identification data of the first subsystem, encrypting, by the SAE, the identification data to generate a first encrypted identification data, and determining, by the SAE, that the first encrypted identification data is listed in a lookup table stored on the SAE. The lookup table includes a plurality of encrypted identifications associated with the plurality of subsystems.

The metadata signature can be a checksum obtained by running the error-check/error-correct code on the computer code embedded in the electronic component.

In some implementations, the first key is removed from the electronic component upon a shutdown or a reboot of the computing system.

The computing system can be (or can be part of) a peritoneal dialysis machine or a hemodialysis machine.

In some implementations, the computer-implemented method further includes: determining, by the SAE, that the first encrypted metadata does not substantially match any key stored in the lookup table, and in response communicating with a central security system to verify whether an authorized change was made on the computer code of the electronic component. The method can further include: receiving a message from the central security system confirming that an authorized change was made on the computer code, and storing a new key in the lookup table for the electronic component. The new key can be generated based on the metadata signature.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available solutions. First, the implementations provide a fast authentication technique. A metadata signature that is generated based on a computer code is much smaller than the code itself. For example, the metadata signature of a 1 megabytes code may be only a few bits. Such smaller size makes the authentication process much faster because instead of reviewing the whole code, only the metadata signature, which is significantly smaller than the code, is reviewed and processed.

Second, the present techniques provide traceable keys. Contrary to the conventional public key-private key authentication techniques, the present techniques provide component-specific keys and subsystem-specific keys. Each electronic component in the present disclosure is associated with a component-specific key and each subsystem is associated with a subsystem-specific key. Using conventional public-private keys for each component would result in a very slow and inefficient authentication process.

Third, the present techniques eliminate a need to integrate an authentication key into each electronic component. Rather, the keys are stored in a lookup table at a security authentication engine (SAE) and do not take any space in the electronic components.

Fourth, a key can be updated upon determining that a valid change has been made on a respective electronic component.

Fifth, each electronic component has to receive an authentication key for its communication with other components of the computing system while the system is powered on. The SAE uses a one-to-one communication with each electronic component to receive the electronic component's metadata signature and to provide an authentication key specific to that electronic component. The electronic component needs the authentication key to be able to communicate with other electronic components of the system. Upon shutting down or rebooting the system, the electronic components lose their authentication keys. This feature allows detecting any unauthorized manipulation of the codes that may have happened between consecutive boots of the system.

Methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Computer code embedded in an electronic component (e.g., a processor, a sensor, etc.) of a medical device, such as a dialysis machine, can be authenticated by comparing a metadata signature derived from the computer code of the electronic component to a key derived from a pre-authenticated code associated with the electronic component. The metadata signature can be derived by running an error-check/error-correct algorithm (e.g., SHA256) on the computer code of the electronic component. A use of the metadata signature enables detection of any unauthorized changes to the computer code as compared to the pre-authenticated code.

A dialysis machine, that may be used in connection with the treatment of renal disease, can include one or more subsystems (e.g., PCBs) that each includes one or more electronic components (e.g., a processor, a sensor, etc.). The authentication process is performed by a security authentication engine (SAE) that can reside on the dialysis machine. Upon booting the dialysis machine, the SAE performs a series of processes to (i) validate the subsystems of the machine, and to (ii) authenticate the computer code embedded in the electronic components of each subsystem.

Figure 1A:
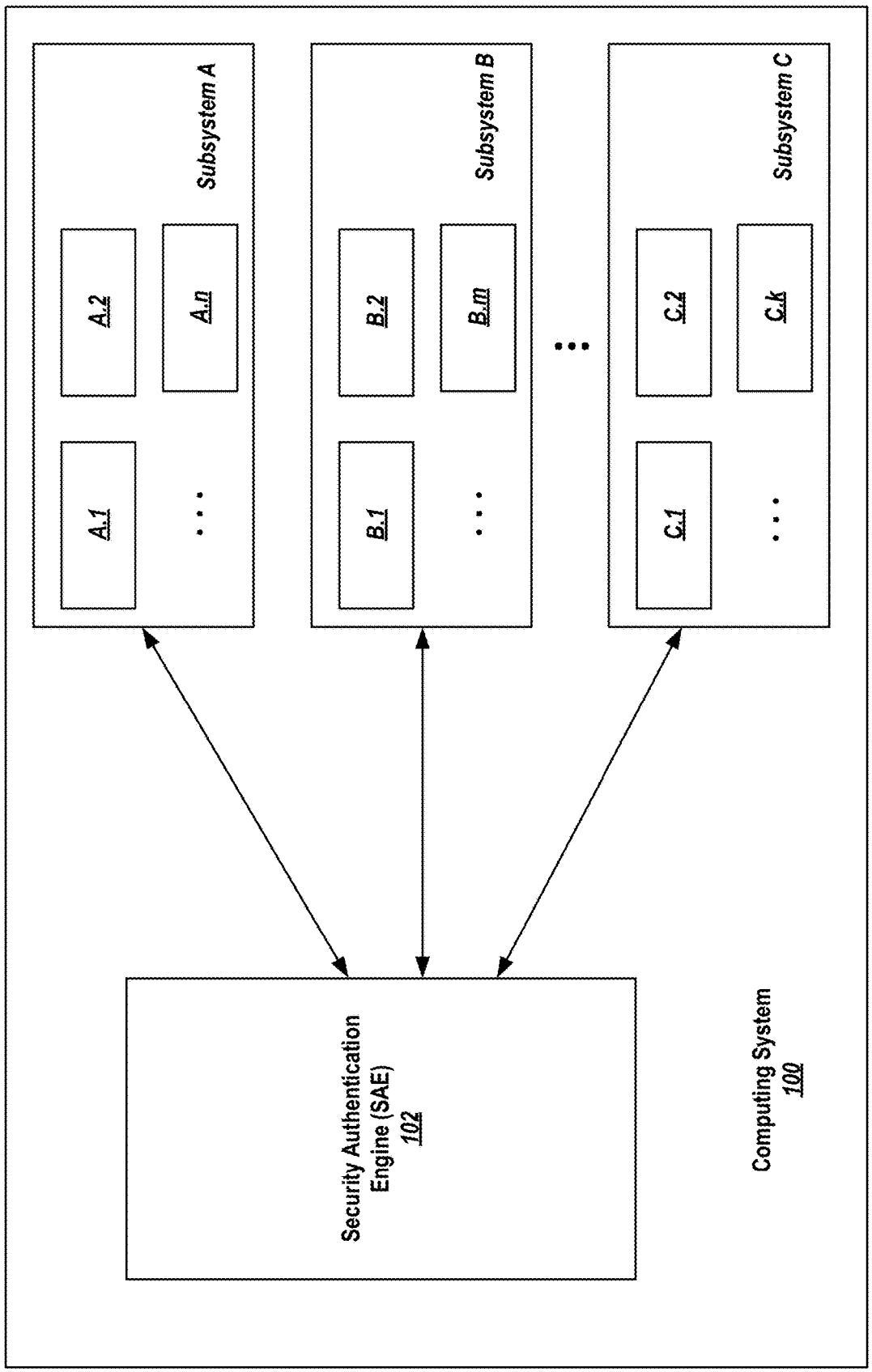
FIGS. 1A and 1B depict an example computing system according to implementations of the present disclosure.
Figure 2A:
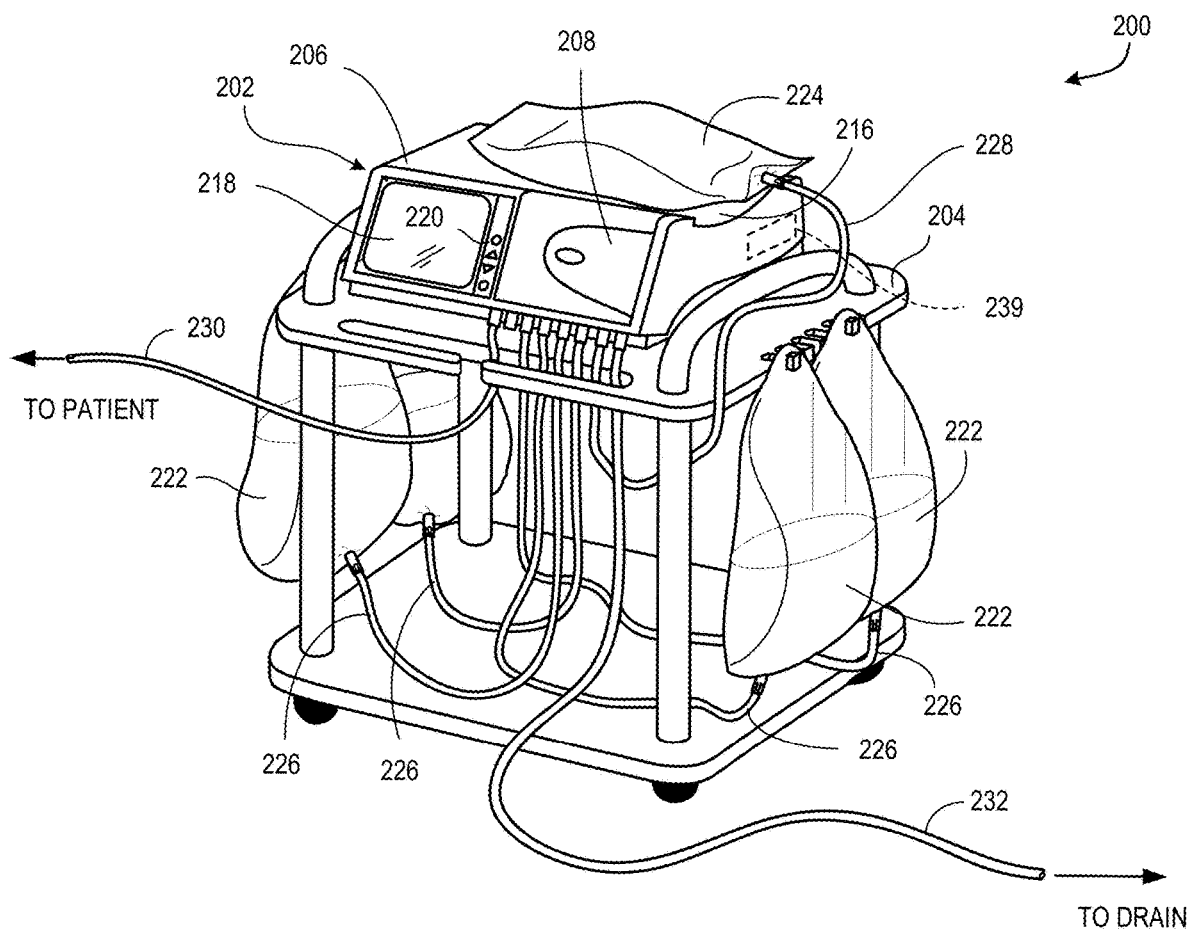
FIG. 2A depicts a peritoneal dialysis (PD) system, as an example medical device for applying the computing system depicted in FIGS. 1A-1B.
Figure 2B:
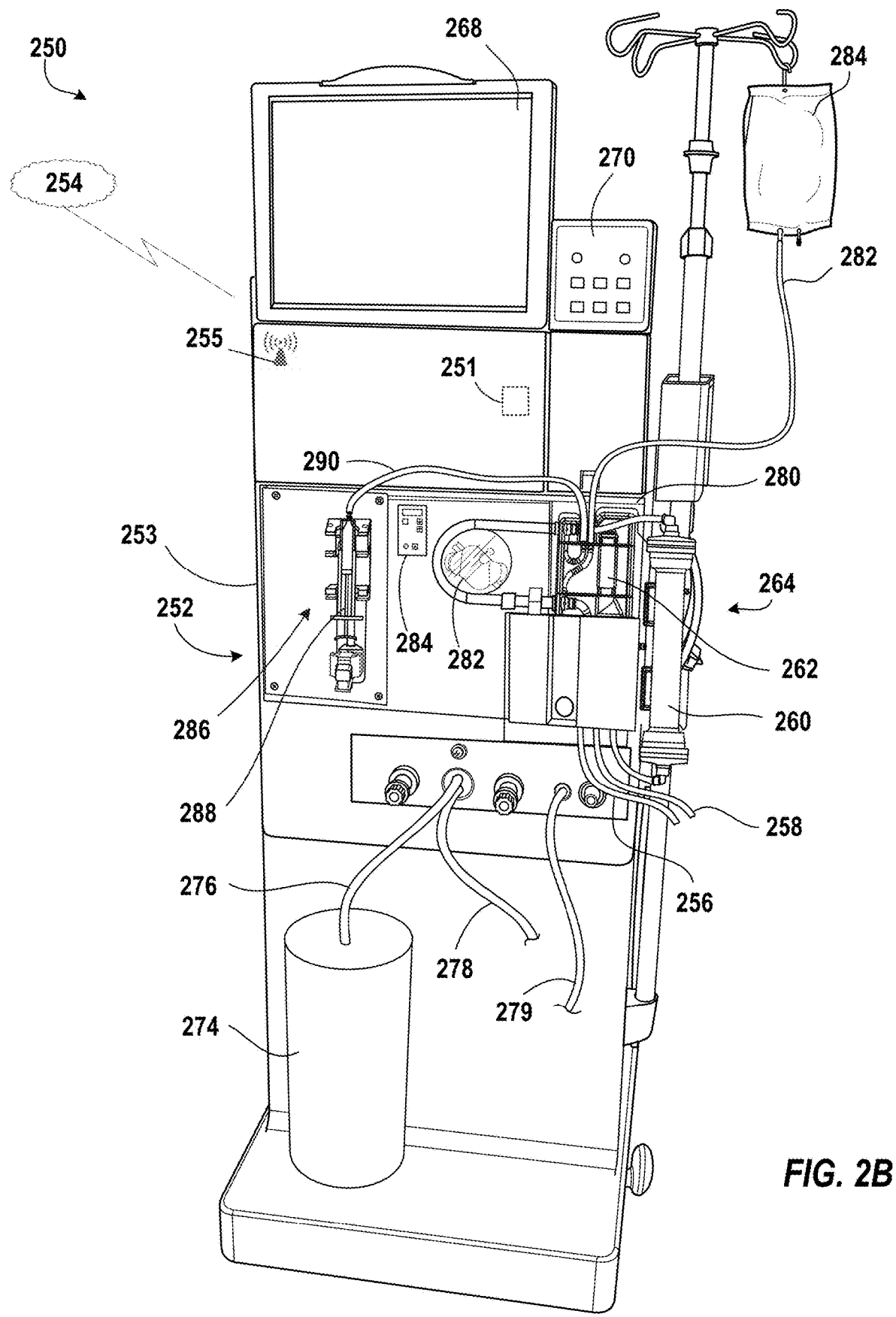
FIG. 2B depicts a hemodialysis (HD) system as an example medical device of applying the computing system depicted in FIGS. 1A-1B.

FIG. 1A depicts an example computing system 100 according to implementations of the present disclosure. FIG. 2A depicts a peritoneal dialysis system 200 and FIG. 2B depicts a hemodialysis system 250 as example medical devices for implementing the system 100. The peritoneal dialysis system 200 and the hemodialysis system 250 are described in detail below.

Although the present techniques are described with reference to dialysis machines, including peritoneal dialysis machines and hemodialysis machines, the disclosed authentication process can be used to authenticate any other forms of computing systems, including computing systems used in connection with other types of medical devices.

The system 100 depicted in FIG. 1A includes multiple subsystems A, B, and C. An example of a subsystem is a printed circuit board (PCB).

Each subsystem includes respective electronic components. Subsystem A has electronic components A.1, A.2, A.3, . . . A.n, subsystem B has electronic components B.1, B.2, B.3, . . . B.m, and subsystem C has electronic components C.1, C.2, C.3, . . . C.k. Examples of an electronic component include, but are not limited to a sensor, a microprocessor, a programmable device, and a CPLD or FPGA device. Each of the electronic components can include a computer code (a "code").

FIG. 1A also depicts a security authentication engine (SAE) 102. Although the SAE 102 is shown as being part of the system 100 in FIG. 1A, in some embodiments it can be outside of the system 100 and communicate with the system 100 or with its electronic components. The SAE 102 can be a field-programmable gate array (FPGA).

Figure 1B:
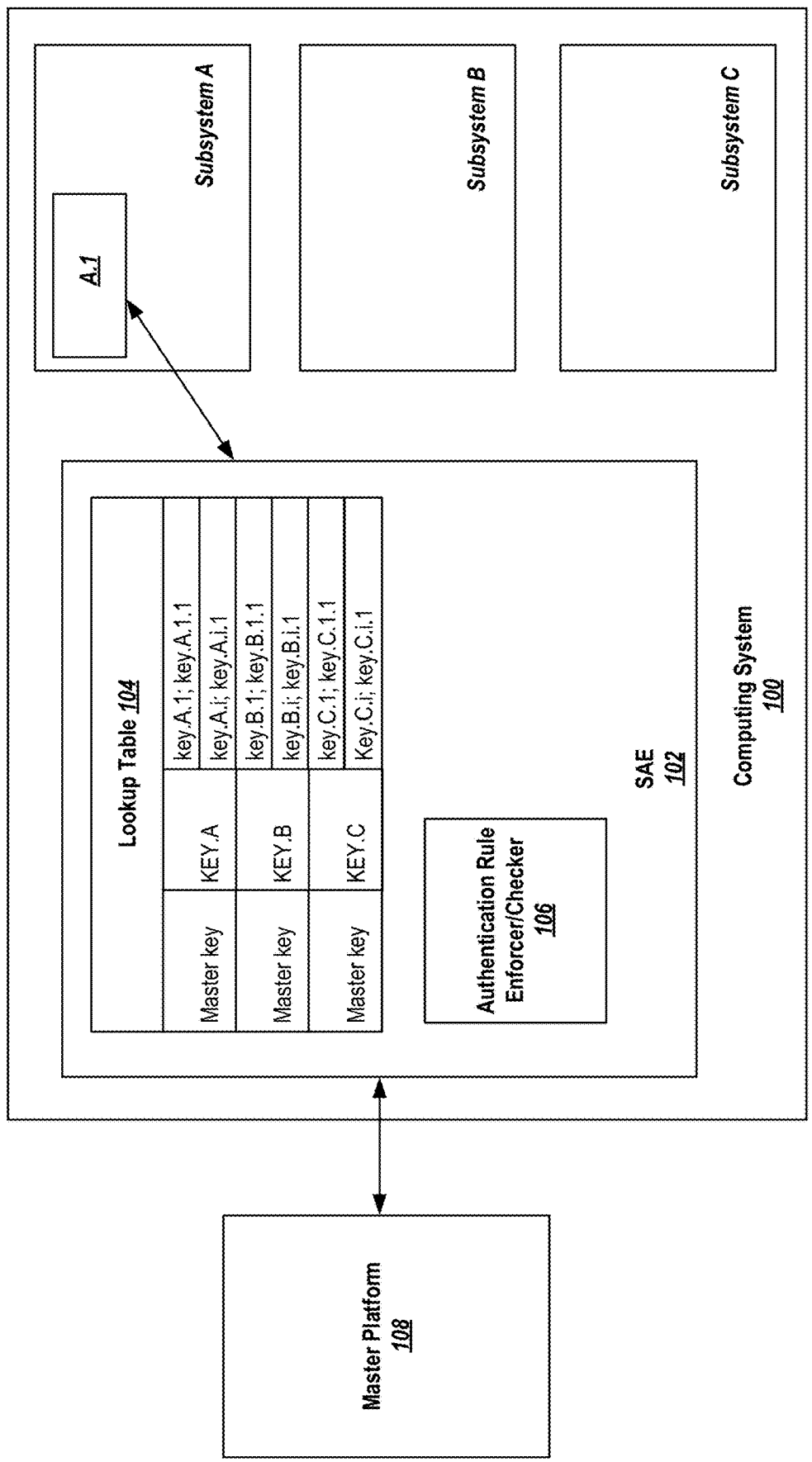

FIG. 1B depicts an SAE 102 that includes a lookup table 104 and an authentication rule enforcer/checker 106. The lookup table may be stored on the SAE 102 or on a memory in communication with the SAE 102. The lookup table 104 includes one KEY for each subsystem (e.g., KEY.A for subsystem A), and one key pair for each electronic component (e.g., key pair "key.A.i; key.A.i.1" for electronic component A.i in subsystem A).

Figure 3A:
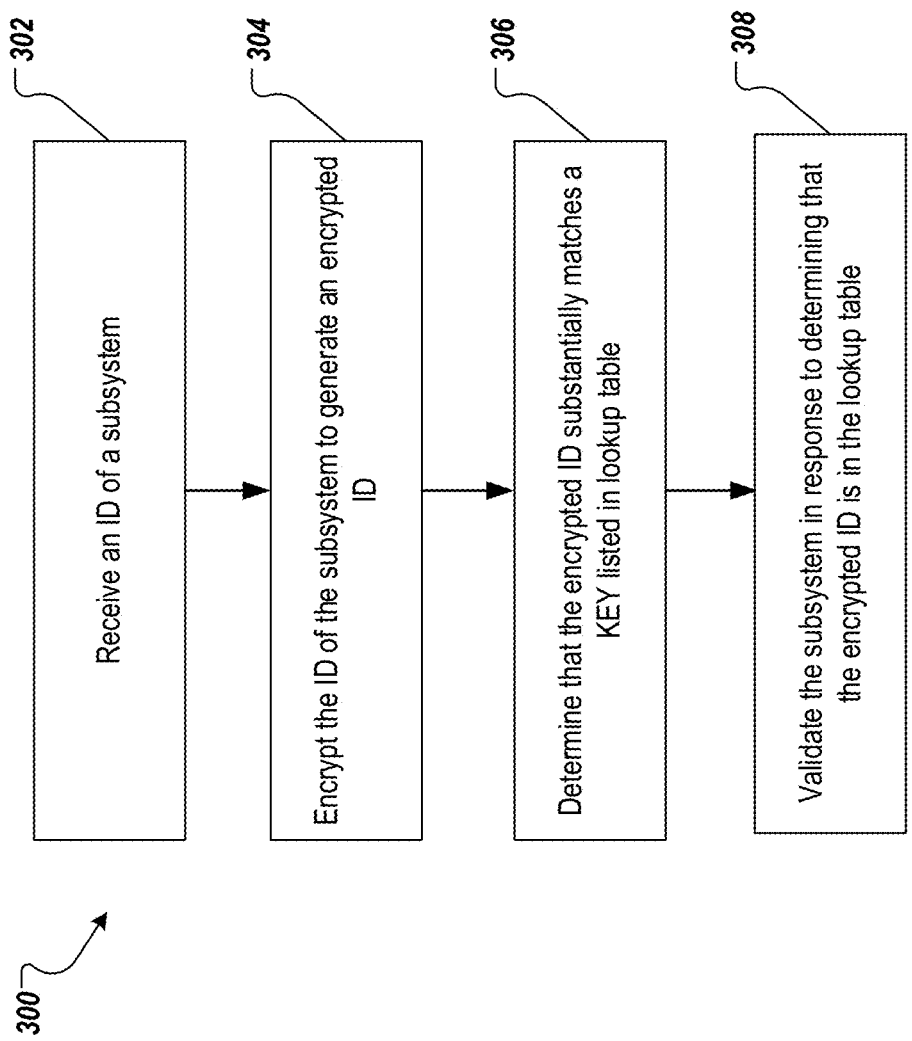
FIG. 3A depicts an example process for validating a subsystem of a computing system, according to implementations of the present disclosure.
Figure 3B:
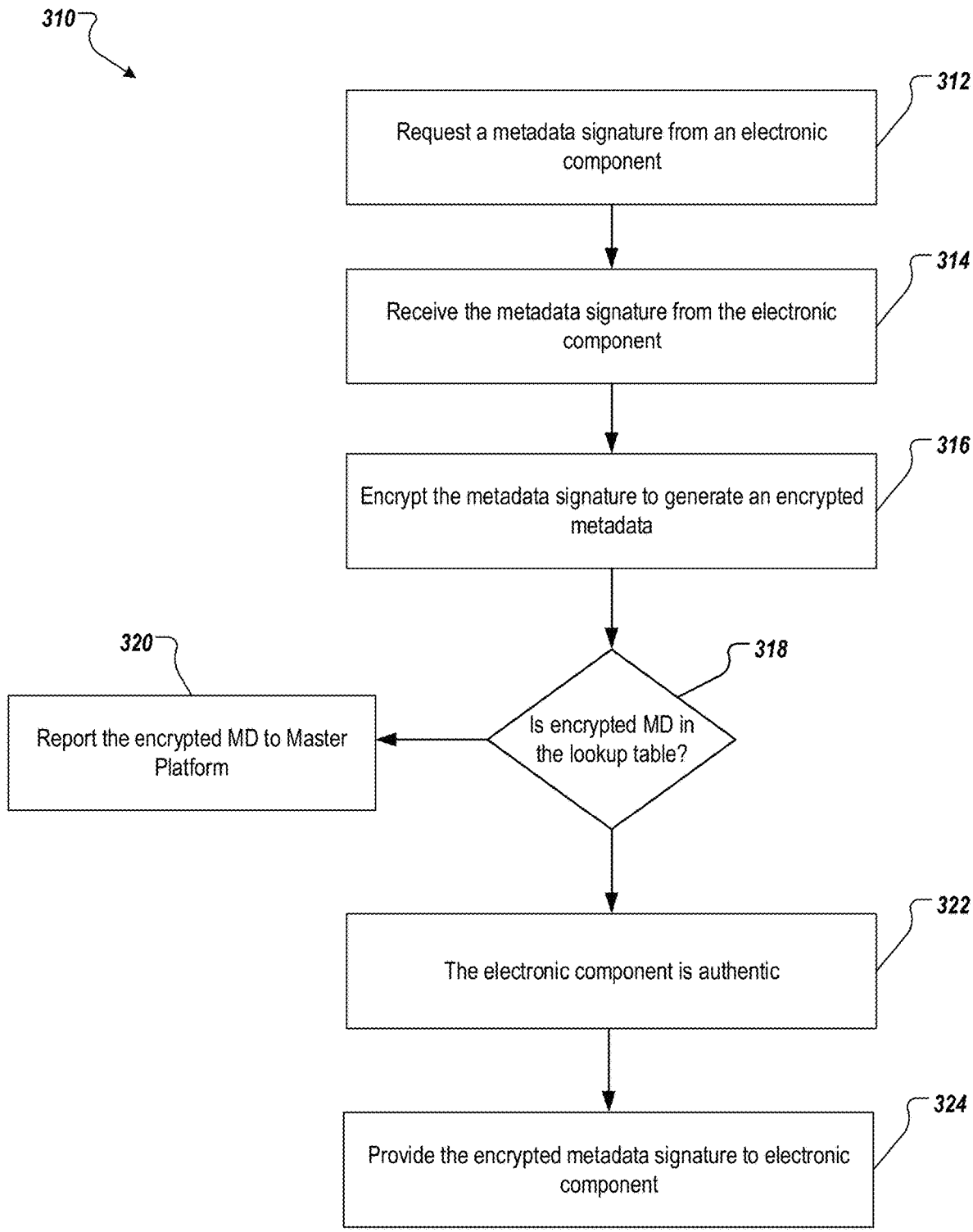
FIG. 3B depicts an example process for authenticating an electronic component of a subsystem, according to implementations of the present disclosure.

As noted above, the SAE 102 is responsible for (i) validating each of the subsystems A, B, and C, and for (ii) authenticating the computer code embedded in respective electronic components (e.g., subsystem A.1, B.1, C.1) of those subsystems. FIG. 3A depicts an example process 300 for validating a subsystem of a computing system according to implementations of the present disclosure. FIG. 3B depicts an example process 310 for authenticating a component of a subsystem according to implementations of the present disclosure. The processes 300 and 310 of FIGS. 3A and 3B are performed by the SAE 102 and are explained in further details below.

For simplicity, the validation and the authentication processes are described below with respect to the subsystem A and the electronic component A.1 of the system 100. Similar processes can be applied for validation of the other subsystems B, C, and for authenticating their respective electronic components.

Validating Subsystems

Upon booting the system 100, the SAE 102 requests identification data of each of the subsystems. Identification data of a subsystem can be a part number (e.g., a PCB part number) or any other reference number specific to that subsystem.

The SAE 102 requests identification data of a subsystem by sending a message to one of the electronic components of the subsystem. For example, in FIG. 1B the SAE 102 requests identification data of subsystem A from the electronic component A.1. The electronic component A.1 may be pre-defined as the initiative component of the subsystem A, or may be a random component used for validation of the subsystem A. Accordingly, the SAE 102 may send its request to the electronic component A.1 or to any other electronic components A.2, A.3, . . . A.n of the subsystem A.

The electronic component A.1 responds back by sending identification data of the subsystem A to the SAE 102. Upon receiving such identification data (302 in FIG. 3A), the SAE 102 encrypts the identification data to generate an encrypted identification data (304). The SAE 102 then searches the lookup table 104 for a KEY that matches or substantially matches the encrypted identification data of subsystem A. The term "substantially matching" as used herein means, for example, that the number of characters or bits that differ between the encrypted identification data and the KEY is fewer than a predetermined threshold number.

If the SAE 102 finds such (substantially) matching KEY (306), the SAE 102 determines that the subsystem A is a valid part of the system 100 (308). However, if no such KEY is found in the lookup table, then the SAE 102 determines that the subsystem A is not a valid part of the system 100 and may put the system 100 into a hold state. The SAE 102 may then provide an error message such as: "suspected programed data integrity failure."

The lookup table 104 stores a set of KEYs. Each KEY in the set of KEYs is associated with a respective subsystem of the system 100. In some implementations, the KEYs are the encrypted forms of identification data of the subsystems. For example, KEY.A can be an encrypted form of a PCB part number of subsystem A. As explained in more details below, the KEYs are provided to the SAE 102 by a Master Rapid Design and Test Platform ("Master Platform") 108, for example, during manufacturing of the system 100.

In some implementations, to request the identification data from the subsystem A, the SAE 102 sends the KEY.A along with a decryption algorithm to the subsystem A. The subsystem A uses its identification information (e.g., its PCB part number) to decrypt KEY.A and returns the decrypted KEY.A (as its identification data) to SAE 102. The SAE 102 then encrypts the decrypted KEY.A received from subsystem A to generate a KEY.A' and checks the lookup table 104 for a (substantially) matching KEY. If the subsystem A has used a valid identification information to decrypt the KEY.A, the KEY.A' (substantially) matches KEY.A and the subsystem A will be validated.

Once the SAE 102 determines that subsystem A is a valid part of the system 100, the SAE 102 starts authenticating the electronic components A. 1, A.2, . . . A.n of the subsystem A.

Authenticating Electronic Components

The SAE 102 checks authenticity of the electronic components of a subsystem by checking the computer codes of each of the electronic components.

To authenticate an electronic component's code, the SAE 102 requests identification information associated with the electronic code. For example, the SAE 102 requests a metadata signature from the electronic component A.1 (312 in FIG. 3B). In response, the electronic component A.1 sends a metadata signature A.1.1 associated with the electronic component A.1. The SAE 102 receives (314) and encrypts the metadata signature A.1.1 to generate an encrypted metadata en.A.1.1 (316). The SAE 102 searches the lookup table 104 for a key that matches or substantially matches the encrypted metadata en.A.1.1 (318). The term "substantially matching" as used herein means, for example, that the number of characters or bits that differ between the encrypted metadata signature en.A.1.1 and a key (e.g., key.A.1.1) is fewer than a predetermined threshold number.

If the SAE 102 finds such key, the SAE 102 concludes that the electronic component's code is authentic (322). However, if the SAE 102 does not find such key, the SAE 102 sends the metadata signature and/or an identification information of the electronic component to the Master Platform 108 (320). The Master Platform 108 checks the metadata signature A.1.1 to determine whether an authorized change was made on the electronic component's computer code.

In general, the metadata signature A.1.1 is derived from a computer code (or metadata) of the electronic component A.1. The metadata signature A.1.1 can be derived from an error-check/error-correct code paired with (or applied on) the electronic component A. 1's computer code. For example, the metadata signature A.1.1 can be Fletcher checksum, Adler checksum, XOR checksum, One's Complement checksum, Two's complement checksum, Cyclic Redundancy Check, or any other checksum derived from an error-check/error-correct algorithm. SHA256 is an example error-check/error-correct algorithm that can be used to derive a metadata signature according to the present disclosure.

The lookup table 104 includes one or more authentication key pairs. Each authentication key pair is associated with a respective electronic component in the system 100. For example, the key pair "key.A.1; key.A.1.1" in FIG. 1B is associated with the electronic component A.1 of the subsystem A.

In some implementations, the SAE 102 uses a key pair associated with an electronic component to request a metadata signature from the electronic component. For example, the SAE 102 sends the key.A.1 associated with the electronic component A.1 to request a metadata signature from the electronic component A.1. The electronic component A.1 uses its metadata to decrypt the key.A.1 and obtain the metadata signature A.1.1. The metadata can be a code embedded in the electronic component A.1. The code can be internal to the electronic component A. 1's microprocessor, FPGA, etc., or can be programmed to an EEPROM or a Flash memory of the electronic component A.1.

The electronic component A.1 then sends the metadata signature A.1.1 to the SAE 102. The SAE 102 encrypts the metadata signature A.1.1 received from the electronic component A.1 to generate an encrypted metadata en.A.1.1. The SAE 102 compares the encrypted metadata en.A.1.1 with the key.A.1.1 that is paired with the key.A.1 in the lookup table 104. If the encrypted metadata en.A.1.1 (substantially) matches the key.A.1.1, SAE 102 concludes that the metadata that the electronic component A.1 had used to decrypt key.A.1 is authentic. As a result, the SAE 102 concludes that (the code in) the electronic component A.1 is authentic.

In response to determining that the electronic component A.1 is authentic, the SAE 102 sends the key.A.1.1 to the electronic component A.1 (324). The electronic component A.1 uses the key.A.1.1 as a validation key for communications with other components (including the SAE 102) of the system 100 during the operation of the system.

Upon shutting down the system 100, the electronic component A.1 loses the key.A.1.1. The electronic component A.1 will need to go through another authentication process upon rebooting of the system 100 to receive the key.A.1.1 again.

Master Platform

In response to determining that the encrypted metadata en.A.1.1 does not match any of authentication keys in the lookup table 104, the SAE 102 sends the metadata signature A.1.1 to a central security system, e.g., the Master Platform 108, to determine whether an authorized change was made on the electronic component A.1's computer code. The SAE 102 may also put the system 100 into a hold state and/or may provide a warning message such as: "suspected programed data integrity failure" until the SAE 102 receives a response from the Master Platform 108. Such message can be displayed on a screen of the system 100 (e.g., screens 218 and 268 in FIGS. 2A and 2B, respectively).

The SAE 102 communicates with the Master Platform 108 through the Authentication Rule Enforcer/Checker ("rule checker") 106. For example, the SAE 102 encodes a message with the suspected metadata signature A.1.1 and/or an identification of the electronic component A.1 and sends the message to the Master Platform through the rule checker 106. For a more secure communication, the SAE or the rule checker may encrypt the message.

The Master Platform 108 decrypts and decodes the message and performs a deep analysis on the metadata signature A.1.1 to either re-authenticate the electronic component A.1, or determine that an unauthorized change had been made on the electronic component A.1's code. For example, the Master Platform 108 may compare the metadata signature A.1.1 to data stored on a Master lookup table. The Master lookup table may record changes, such as updates, to the computer codes of the electronic components of any system (e.g., system 100) that is in a network of the Master Platform 108.

In response to determining that the metadata signature A.1.1 conforms to the changes recorded in the Master lookup table, the Master Platform 108 re-authenticates the electronic component A.1 by sending a new metadata signature newA.1.1 to the rule checker 106 of the SAE 102. The SAE 102 then updates its lookup table, for example, by encrypting the new metadata signature newA.1.1 to obtain a key.newA.1.1 and by replacing the key.A.1.1 with the key.newA.1.1.

The Master Platform 108 generates the new metadata signature by using an error-check/error-correct algorithm, such as SHA256. The new metadata signature newA.1.1 may be the same as the metadata signature A.1.1, which reflects the authorized changes on the computer code, or may be different from the metadata signature A.1.1. For example, the new metadata signature newA.1.1 may reflect some other changes that are not reflected by the metadata signature A.1.1. Those other changes can be updates that are scheduled to happen for the electronic component within a predetermined period of time (e.g., the next 24 hours).

If the Metadata Platform 108 finds that the metadata signature A.1.1 does not conform with the changes recorded in the Master lookup table, the Master Platform 108 sends a failure message to the rule checker 106 of the SAE 102. In response, the SAE 102 blocks the operations of the system 100 or the electronic component A.1. The SAE may provide an error message indicating that the authentication has failed.

The Master Platform 108 records the failed security incident on a permanent (e.g., flash) memory. The record can include identification information of the electronic component A.1, of the subsystem A to which the electronic component A.1 belongs, of the SAE 102, and/or of the system 100.

The Master Platform 108 can determine what went wrong that resulted in the authentication failure. For example, Master Platform 108 can determine a source of the error such as whether electronic component had faced a cyber-attack, a machine error, a human error, etc.

The Master Platform 108 is also responsible for providing initial keys (e.g., KEY.A, key pair "key.A.1; key.A.1.1") to the SAE 102. For example, during a manufacturing or a test of the system 100, the Master Platform 108 may investigate the electronic components and/or subsystems of the system 100 and provide respective keys based on the codes embedded in those electronic components and/or subsystems. The Master Platform 108 sends those keys to SAE 102 to be stored in the lookup table 104.

Figure 1C:
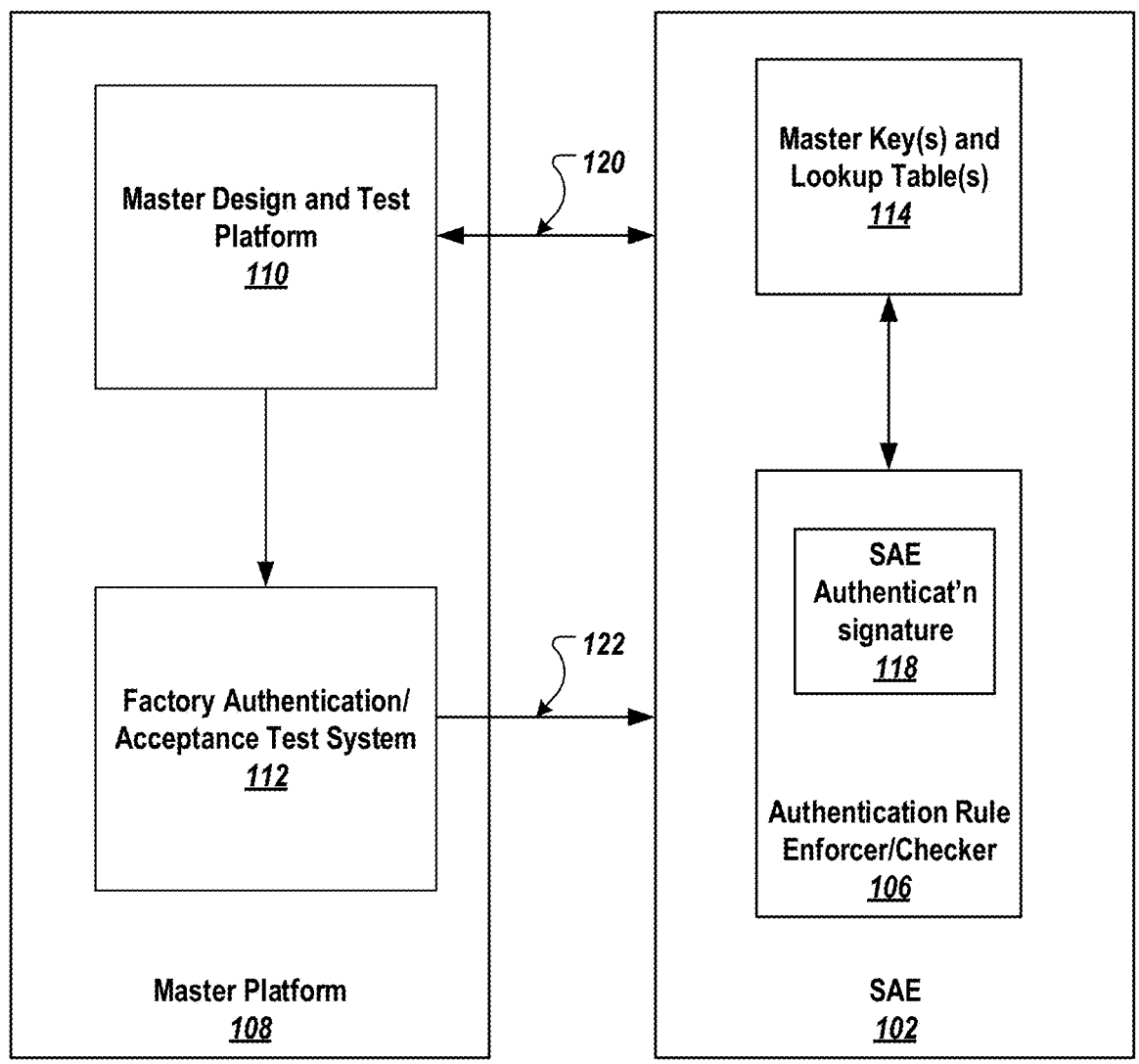
FIG. 1C illustrates communications between an example Master Platform and an example security authentication engine (SAE) of the computing system depicted in FIGS. 1A-1B.

FIG. 1C illustrates communications between an example Master Platform 108 and a SAE 102 of the example computing system 100. The Master Platform 108 in FIG. 1C includes a Master Design and Test Platform ("Design/Test Platform") 110 and a Factory Authentication and Acceptance Test System ("Factory Test System") 112. The SAE 102 in FIG. 1C includes Master key(s) and lookup table(s) 114 (e.g., the lookup table 104) and the rule checker 106, which can include a storage for storing rules and constrains such as SAE authentication signature 118.

Initially, the Design/Test Platform 110 generates the authentication parameters for the SAE 102 and delivers the authentication parameters to the Factory Test System 112. The Factory Test System 112 implements (122) the authentication parameters on the SAE 102 during manufacturing of the SAE 102 or of the computing system 100. The authentication parameters include the Master key(s), the lookup table(s), and the SAE authentication signature.

Accordingly, the Factory Test System 112 performs at least the following functions during manufacturing and/or test of the SAE 102: (i) loading the Master security key(s) and lookup table(s) 114 into the SAE 102, (ii) authenticating the SAE 102 and/or any other components of the computing system 100, (iii) loading the SAE authentication signature 118 into the SAE 102, and (iv) loading authentication rules and constrains into the SAE 102. In some implementations, at least part of the information received from the Factory Test System 112 are stored on the rule checker 106.

During operations of the computing system 100, when the SAE 102 identifies a suspicious subsystem or electronic component, the SAE 102 directly communicates (120) with the Design/Test Platform 110 to validate and/or re-authenticate the suspected subsystems or electronic components.

Accordingly, the Design/Test Platform performs at least the following functions: (i) generating the Master key(s) and lookup table(s) 114 including Master keys, validation KEYs for subsystems of the SAE 102, and authentication key pairs for electronic components of the SAE 102, (ii) setting up rules and constrains such as encryption/decryption procedures, mappings between validation KEYs and authentication kay pairs, (iii) generating SAE authentication signature 118 for SAE 102, and (iv) performing system validation and authentication of the computing system 100 or SAE 102.

The Design/Test Platform 110 may validate/revalidate the SAE 102 before responding to the SAE's validation/authentication requests. For example, Design/Test Platform 110 may set an SAE authentication signature 118 (e.g., the static part of the SAE 102's Master key) during manufacturing of the SAE 102 and send the SAE authentication signature 118 to the Factory Test System 112. The Factory Test System 112 implements the SAE authentication signature 118 into the rule checker 106. The Design/Test Platform 110 may then require (e.g., request) the SAE 102 to provide the SAE authentication signature 118 for each communication that the SAE 102 makes with the Design/Test Platform 110.

As noted above, the SAE 102 can communicate with the Master Platform 108 through the rule checker 106. In some implementations, the rule checker 106 stores rules and constrains that are received from the Master Platform 108. For example, the rule checker 106 can store the authentication signature(s) 118 specific to the SAE 102, store encryption/decryption algorithms to be performed by SAE 102, and update the Master key(s) and lookup table(s) 114 based on the communications from the Master Platform 108.

In some implementations, before the SAE 102 initiates validating/authenticating the computer system 100's subsystems and electronic components, the rule checker 106 checks whether the SAE's authentication signature 118 satisfies predetermined rules or constraints. If the authentication signature 118 does not satisfy the predetermined rules or constraints, the SAE would not initialize its validation/authentication process, and the subsystems and electronic components of the system 100 would not start functioning.

Data Encryption

As noted above, to validate the subsystem A, the SAE 102 encrypts the identification data received from subsystem A and compares the encrypted identification data with the KEYs stored in the lookup table 104. The SAE 102 encrypts the identification data by using a Master key.

The Master key is provided to the SAE 102 by the Master Platform 108. For example, during a manufacturing or a test of the system 100, the Master Platform 108 may review the electronic components and/or subsystems of the system 100 and generate a Master key for the system 100 based on its electronic components and/or subsystems.

The Master key has a static part and a dynamic part. The static part is specific to the system 100 and is generated for the specific parameters (e.g., subsystems) of system 100.

The dynamic part varies for each subsystem and for each electronic component. The SAE 102 uses the Master key to encrypt the identification data of subsystem A in order to determine a validity of the subsystem A. In some implementations, the SAE 102 uses (at least a portion of) the static part of the Master key to encrypt the identification data of the subsystems.

As noted above, the SAE 102 encrypts the metadata signature received from each electronic component in order to determine whether the electronic component is authentic. The SAE 102 encrypts the metadata signature by using the Master key. In some implementations, the SAE 102 uses (at least a portion of) the Master key's dynamic part associated with the electronic component A.1 to encrypt the metadata signature. As mentioned above, the Master key has a dynamic part that varies based on the electronic component that the Master key is used for.

Authenticating and Validating a System

The SAE 102 performs the above-described process to validate all subsystems A, B, C and to authenticate all electronic components A.1, A.2, . . . , A.n, B.1, B.2, . . . B.m, C.1, C.2, . . . , C.k of system 100.

In some implementations, the SAE 102 validates the subsystems A, B, C of the system 100 in parallel. In this case, if any subsystem is identified as invalid, the SAE 102 may put the system 100 into a hold state and provide an error message.

In some implementation, the SAE 102 validates the subsystems A, B, C of the system 100 sequentially or at least partly sequential. For example, the SAE 102 may start validating subsystem B after subsystem A is already validated, may validate subsystems B and C in parallel and only after subsystem A is validated, or may start validating subsystem B only after subsystem A is validated and after all electronic components of subsystem A have been authenticated. A validation sequence of the subsystems can be predefined and stored in the SAE 102.

Some subsystems may have a higher priorities than one or more other subsystems. The higher priority subsystems may be validated first. Some subsystems may depend on one or more other subsystems. The priority of and/or the dependency between the subsystems may determine a validation sequence of the subsystems.

Figure 3C:
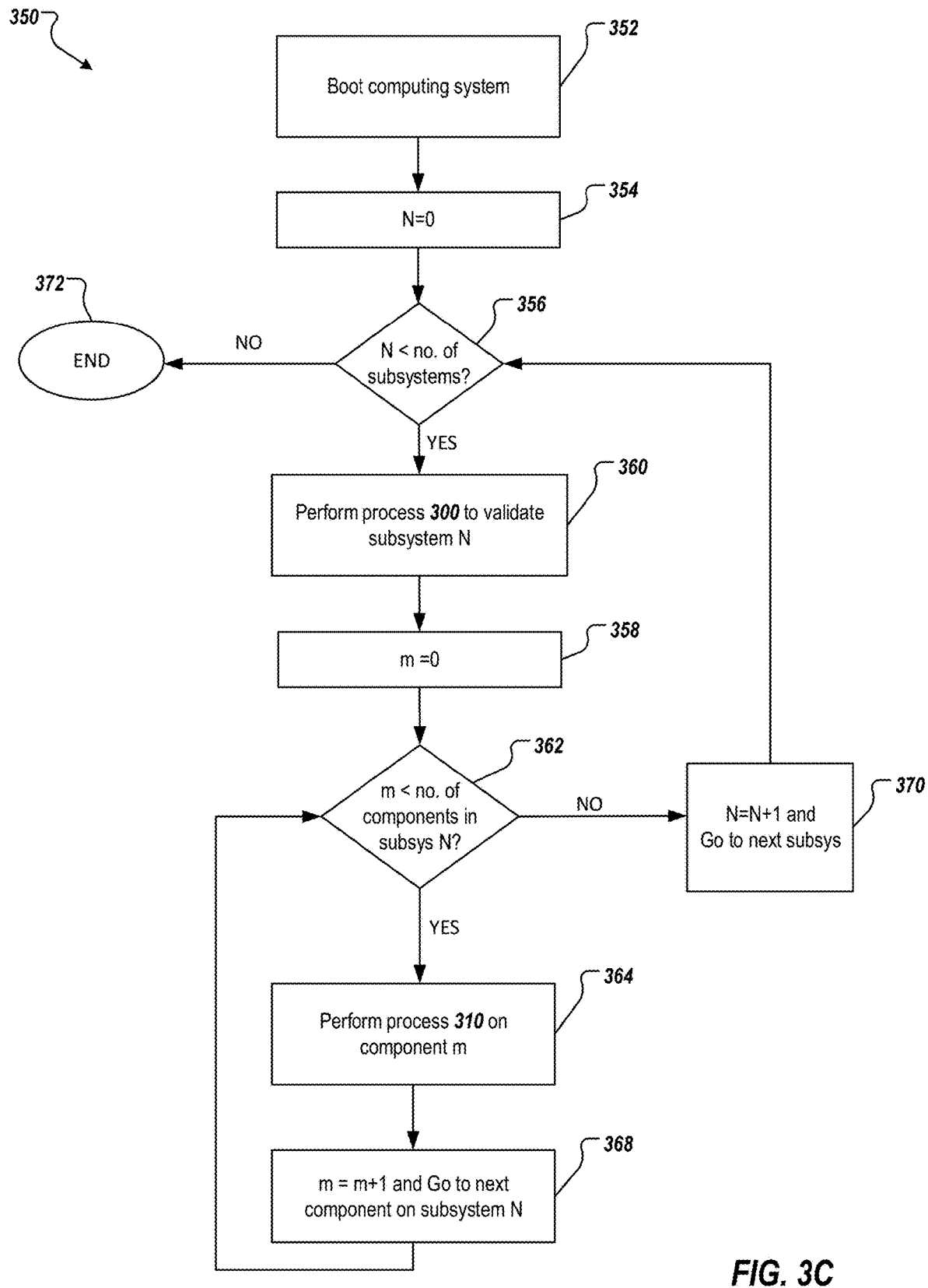
FIG. 3C depicts an example process for validating and authenticating a computing system, according to implementations of the present disclosure.

FIG. 3C depicts an example process 350 for validating and authenticating a computing system according to implementations of the present disclosure. As will be described in further details below, the process 350 validates the subsystems sequentially, and starts validating a succeeding subsystem only after all electronic components of a preceding (validated) subsystem has been authenticated. However, in other implementations multiple steps described in FIG. 3C can be performed in parallel. For example, multiple subsystems may be validated in parallel; multiple electronic components may be authenticated in parallel; or while a subsystem is being validated, the electronic components of one or more other subsystems may be authenticated.

Upon booting the computing system 100 (352), the SAE 102 identifies the subsystems of the system 100. The SAE 102 then starts validating a first subsystem (e.g., subsystem A) by setting N, which is a current number of validated subsystems, to 0 (354). The SAE 102 then checks whether the current number of validated subsystems is less than the total number of subsystems on system 100 (356). If the current number is not less than the total number of subsystems, all subsystems have been validated and their electronic components have been authenticated; thus, the SAE 102 ends the process (372) and allows the system 100 to operate.

If the current number of validated subsystems is less than the total number of system 100's subsystems, the SAE 102 performs the subsystem validation process described above and depicted in FIG. 3A (360).

Upon validating the current subsystem (i.e., subsystem N), the SAE 102 starts authenticating the subsystem's electronic components. To do so, the SAE 102 starts with a first electronic component (e.g., A.1) of the subsystem and sets m, which is a current number of the authenticated electronic components within the subsystem, to 0 (358). The SAE 102 then checks whether the current number m of the authenticated electronic components is less than a total number of electronic components in the subsystem N (362).

If the current number m is less than the total number, the SAE 102 performs the electronic component authentication process described above and depicted in FIG. 3B (364). Once the electronic component is authenticated, the SAE 102 moves to a next electronic component of the subsystem that has not been authenticated yet, and increments m by one (368). The SAE 102 continues this process until all electronic components of the current subsystem (N) are authenticated.

Once all of the electronic components of the subsystem N are authenticated (i.e., m=total number of the electronic components of subsystem N), the SAE 102, increments N by one and moves to a next subsystem to validate it and authenticate its electronic components (370).

Example Medical System

The peritoneal dialysis (PD) system 200 in FIG. 2A and the hemodialysis (HD) system 250 show example medical devices for implementing the computing system 100 of FIG. 1. For example, the computing system 100 can be part of the PD machine 202 in the PD system 200, can be part of the HD machine 252 of the HD system 250, or can be in communication with the PD machine 202 or the HD machine 252, for example, through the transceiver 255.

In some implementations, the PD system 200 is configured for use at a patient's home (e.g., a home PD system). In some implementations, the HD system 250 is configured for use at a patient's home (e.g., a home HD system).

The peritoneal dialysis system 200 includes a PD machine (also generally referred to as a PD cycler) 202 seated on a cart 204. The PD machine 202 includes a housing 206, a door 208, and a cassette interface 210 that contacts a disposable PD cassette 212 when the cassette 212 is disposed within a cassette compartment 214 formed between the cassette interface 210 and the closed door 208. A heater tray 216 is positioned on top of the housing 206. The heater tray 216 is sized and shaped to accommodate a bag of PD solution such as dialysate (e.g., a 5 liter bag of dialysate). The PD machine 202 also includes a user interface such as a touch screen display 218 and additional control buttons 220 that can be operated by a user (e.g., a caregiver or a patient) to allow, for example, set up, initiation, and/or termination of a PD treatment.

Dialysate bags 222 are suspended from fingers on the sides of the cart 204, and a heater bag 224 is positioned in the heater tray 216. The dialysate bags 222 and the heater bag 224 are connected to the cassette 212 via dialysate bag lines 226 and a heater bag line 228, respectively. The dialysate bag lines 226 can be used to pass dialysate from dialysate bags 222 to the cassette 212 during use, and the heater bag line 228 can be used to pass dialysate back and forth between the cassette 212 and the heater bag 224 during use. In addition, a patient line 230 and a drain line 232 are connected to the cassette 212. The patient line 230 can be connected to a patient's abdomen via a catheter and can be used to pass dialysate back and forth between the cassette 212 and the patient's peritoneal cavity during use. The catheter may be connected to the patient line 230 via a port such as a fitting. The drain line 232 can be connected to a drain or drain receptacle and can be used to pass dialysate from the cassette 212 to the drain or drain receptacle during use.

The PD machine 202 also includes a control unit 239 (e.g., a processor). The control unit 239 can receive signals from and transmit signals to the touch screen display 218, the control panel 220, and the various other components of the PD system 200. The control unit 239 can control the operating parameters of the PD machine 102. In some implementations, the control unit 239 is an MPC823 PowerPC device manufactured by Motorola, Inc.

The HD system 250 illustrated in FIG. 2B includes an HD machine 252 to which a disposable blood component set 264 that forms a blood circuit is connected. During hemodialysis, arterial and venous patient lines 256, 258 of the blood component set 264 are connected to a patient and blood is circulated through various blood lines and components, including a dialyzer 260, of the blood component set 264. At the same time, dialysate is circulated through a dialysate circuit formed by the dialyzer 260 and various other dialysate components and dialysate lines connected to the HD machine 252. Many of these dialysate components and dialysate lines are located inside the housing 253 of the HD machine 252, and are thus not visible in FIG. 2B. The dialysate passes through the dialyzer 260 along with the blood. The blood and dialysate passing through the dialyzer 260 are separated from one another by a semi-permeable structure (e.g., a semi-permeable membrane and/or semi-permeable microtubes) of the dialyzer 260. As a result of this arrangement, toxins are removed from the patient's blood and collected in the dialysate. The filtered blood exiting the dialyzer 260 is returned to the patient. The dialysate that exits the dialyzer 260 includes toxins removed from the blood and is commonly referred to as "spent dialysate." The spent dialysate is routed from the dialyzer 260 to a drain.

One of the components of the blood component set 264 is an air release device 262. The air release device 262 includes a self-sealing vent assembly that allows air to pass through while inhibiting (e.g., preventing) liquid from passing through. As a result, if blood passing through the blood circuit during treatment contains air, the air will be vented to atmosphere as the blood passes through the air release device 262.

As shown in FIG. 2B, a dialysate container 274 is connected to the HD machine 252 via a dialysate supply line 276. A drain line 278 and an ultrafiltration line 279 also extend from the HD machine 252. The dialysate supply line 276, the drain line 278, and the ultrafiltration line 279 are fluidly connected to the various dialysate components and dialysate lines inside the housing 253 of the HD machine 252 that form part of the dialysate circuit. During hemodialysis, the dialysate supply line 276 carries fresh dialysate from the dialysate container 274 to the portion of the dialysate circuit located inside the HD machine 252. As noted above, the fresh dialysate is circulated through various dialysate lines and dialysate components, including the dialyzer 260, that form the dialysate circuit. As the dialysate passes through the dialyzer 260, it collects toxins from the patient's blood. The resulting spent dialysate is carried from the dialysate circuit to a drain via the drain line 278. When ultrafiltration is performed during treatment, a combination of the spent dialysate and excess fluid drawn from the patient is carried to the drain via the ultrafiltration line 279.

The blood component set 264 is secured to a module 280 attached to the front of the HD machine 252. The module 280 includes a blood pump 282 capable of driving blood through the blood circuit. The module 280 also includes various other instruments capable of monitoring the blood flowing through the blood circuit. The module 280 includes a door that when closed, as shown in FIG. 2B, cooperates with the front face of the module 280 to form a compartment sized and shaped to receive the blood component set 264. In the closed position, the door presses certain blood components of the blood component set 264 against corresponding instruments exposed on the front face of the module 280. Such an arrangement facilitates control of the flow of blood through the blood circuit and monitoring of the blood flowing through the blood circuit.

The blood pump 282 can be controlled by a blood pump module 284. The blood pump module 284 includes a display window, a start/stop key, an up key, a down key, a level adjust key, and an arterial pressure port. The display window displays the blood flow rate setting during blood pump operation. The start/stop key starts and stops the blood pump 282. The up and down keys increase and decrease the speed of the blood pump 282. The level adjust key raises a level of fluid in an arterial drip chamber.

A drug pump 286 also extends from the front of the HD machine 252. The drug pump 286 is a syringe pump that includes a clamping mechanism configured to retain a syringe 288 of the blood component set 264. The drug pump 286 also includes a stepper motor configured to move the plunger of the syringe 288 along the axis of the syringe 288. A shaft of the stepper motor is secured to the plunger in a manner such that when the stepper motor is operated in a first direction, the shaft forces the plunger into the syringe 288, and when operated in a second direction, the shaft pulls the plunger out of the syringe 288. The drug pump 286 can thus be used to inject a liquid drug (e.g., heparin) from the syringe 288 into the blood circuit via a drug delivery line 290 during use, or to draw liquid from the blood circuit into the syringe 288 via the drug delivery line 290 during use.

The HD machine 252 includes a touch screen 268 and a control panel 270. The touch screen 268 and the control panel 270 allow an operator to input various treatment parameters to the HD machine 252 and to otherwise control the HD machine 252. In addition, the touch screen 268 serves as a display. The touch screen 268 functions to provide information to the patient and the operator of the HD system 250. For example, the touch screen 268 may display information related to a dialysis treatment to be applied to the patient, including information related to a prescription, as described above.

The HD machine 252 includes a processing module 251 that resides inside the machine and which is configured to communicate with the touch screen 268 and the control panel 270. The processing module 251 is configured to receive data from the touch screen 268 and the control panel 270 and control the HD machine 252 based on the received data. For example, the processing module 251 can adjust the operating parameters of the HD machine 252.

The HD machine 252 is configured to connect to a network 254. The HD machine 252 includes a transceiver 255 that is configured to facilitate the connection to the network 254. Other medical devices (e.g., peripheral devices or monitors, other dialysis machines, etc.) may be configured to connect to the network 254 and communicate with the HD machine 252. Similarly, one or more remote entities, such as issuers of digital prescription files and/or authority services tasked with verifying identities of issuers and certifying ownership of public keys corresponding to the issuers, may be able to connect to the network 254 and communicate with the HD machine 252 in order to provide digital prescriptions for implementing on the HD machine 252, digital certificates, and/or public keys usable to check digital signatures, as described above.

Figure 4:
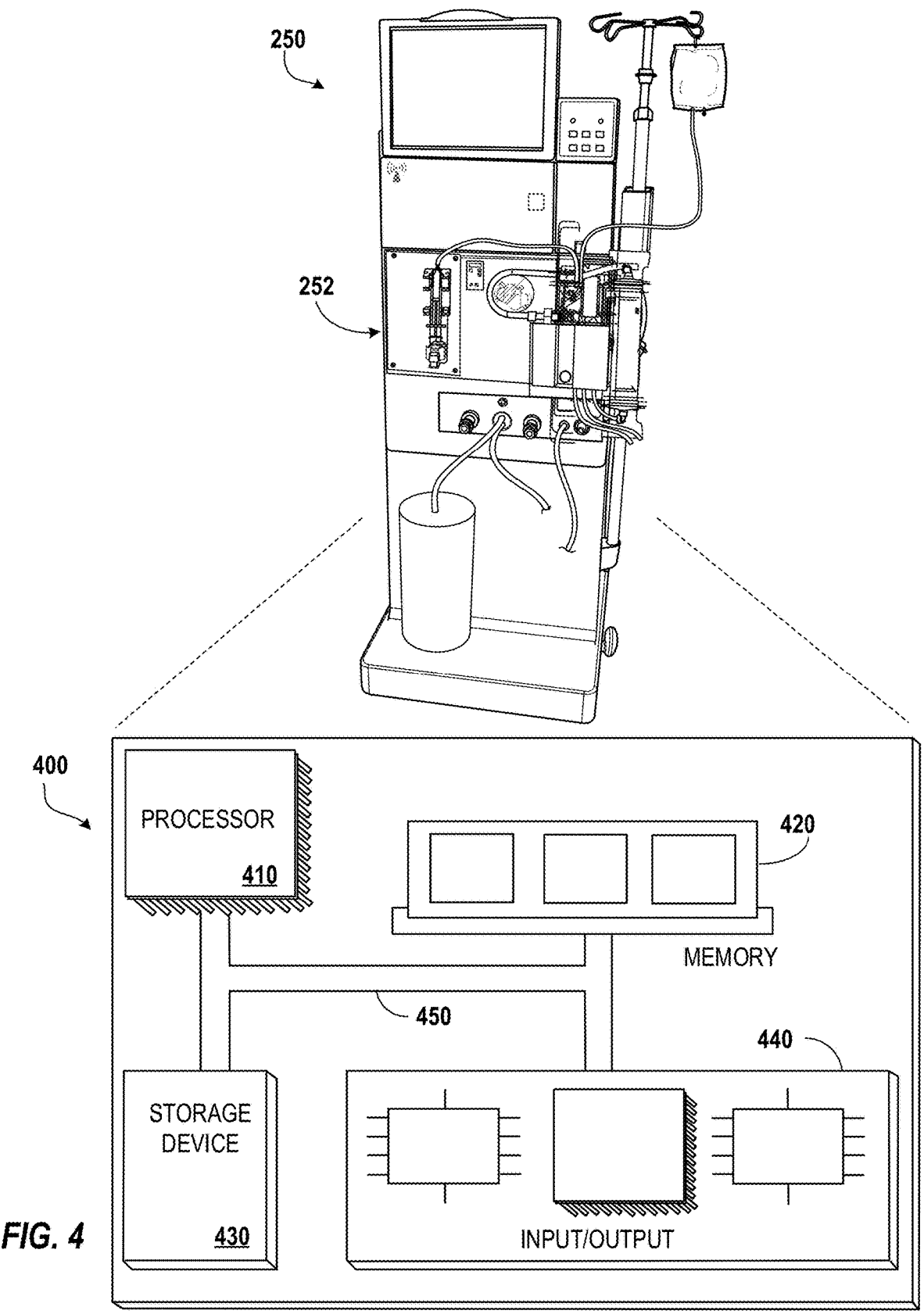
FIG. 4 is a block diagram of an example computing system, according to implementations of the present disclosure.

FIG. 4 is a block diagram of an example computer system 400 that can be used as part of the system 100, for example to perform functions of SAE 102, and illustrated, for example, in connection with the hemodialysis system 250. A control unit, a computing device, and/or a microcontroller could be examples of the system 400 described here. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. The processor 410 can be a single-threaded processor, a multi-threaded processor, or a quantum computer. The processor 410 is capable of processing instructions stored in the memory 420 or on the storage device 430. The processor 410 may execute operations such as causing the dialysis system to carry out dialysis functions.

The memory 420 stores information within the system 400. In some implementations, the memory 420 is a computer-readable medium. The memory 420 can, for example, be a volatile memory unit or a non-volatile memory unit. In some implementations, the memory 420 stores information for causing the pumps of the dialysis system to operate as described herein.

The storage device 430 is capable of providing mass storage for the system 400. In some implementations, the storage device 430 is a non-transitory computer-readable medium. The storage device 430 can include, for example, a hard disk device, an optical disk device, a solid-date drive, a flash drive, magnetic tape, or some other large capacity storage device. The storage device 430 may alternatively be a cloud storage device, e.g., a logical storage device including multiple physical storage devices distributed on a network and accessed using a network.

The input/output device 440 provides input/output operations for the system 400. In some implementations, the input/output device 440 includes one or more of network interface devices (e.g., an Ethernet card), a serial communication device (e.g., an RS-232 10 port), and/or a wireless interface device (e.g., an 802.11 card, a 3G wireless modem, or a 4G wireless modem). In some implementations, the input/output device 440 may include short-range wireless transmission and receiving components, such as Wi-Fi, Bluetooth, and/or near field communication (NFC) components, among others. In some implementations, the input/output device includes driver devices configured to receive input data and send output data to other input/output devices, e.g., keyboard, printer and display devices (such as the touch screen display 118). In some implementations, mobile computing devices, mobile communication devices, and other devices are used.

In some implementations, the system 400 is a microcontroller. A microcontroller is a device that contains multiple elements of a computer system in a single electronics package. For example, the single electronics package could contain the processor 410, the memory 420, the storage device 430, and input/output devices 440.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method implemented by a security authentication engine (SAE) of a computing system, the method comprising:

receiving a metadata signature from an electronic component of the computing system;
generating first encrypted metadata based on the metadata signature received from the electronic component; and
in response to determining that the first encrypted metadata is substantially different from a first key that is associated with the electronic component and is stored in the SAE,
blocking operation of the electronic component from which the metadata signature was received; and
storing, in a permanent memory, authentication failure information and error source information associated with the electronic component.

2. The method of claim 1, further comprising:
in response to determining that the first encrypted metadata is substantially different from the first key,
determining that a subsystem associated with the electronic component is not a valid subsystem of the computing system; and
causing the computing system to enter a hold state.

3. The method of claim 1, wherein the first key is stored in a lookup table comprising a plurality of keys, each key of the plurality of keys being associated with a respective electronic component of the computing system.

4. The method of claim 1, wherein:
the first key is part of a key pair associated with the electronic component, the key pair including a second key, and
the metadata signature is generated by decrypting the second key based on computer code embedded in the electronic component.

5. The method of claim 1, wherein:
the computing system includes a plurality of subsystems and the electronic component resides on a first subsystem of the plurality of subsystems, and
the SAE requests the metadata signature in response to determining that the first subsystem is a valid subsystem of the computing system.

6. The method of claim 1, wherein the metadata signature is a checksum obtained by running an error-check/error-correct code on the electronic component.

7. The method of claim 1, wherein the first key is removed from the electronic component upon a shutdown or a reboot of the computing system.

8. The method of claim 1, wherein the computing system comprises a peritoneal dialysis machine or a hemodialysis machine.

9. A computing system comprising one or more computers configured to execute received instructions that cause the one or more computers to perform operations of a security authentication engine (SAE), the operations comprising:
receiving a metadata signature from an electronic component of the computing system;
generating first encrypted metadata based on the metadata signature received from the electronic component; and
in response to determining that the first encrypted metadata is substantially different from a first key that is associated with the electronic component and is stored in the SAE,
blocking operation of the electronic component from which the metadata signature was received; and
storing, in a permanent memory, authentication failure information and error source information associated with the electronic component.

10. The computing system of claim 9, wherein the operations further comprise:
in response to determining that the first encrypted metadata is substantially different from the first key,
determining that a subsystem associated with the electronic component is not a valid subsystem of the computing system; and
causing the computing system to enter a hold state.

11. The computing system of claim 9, wherein the first key is stored in a lookup table comprising a plurality of keys, each key of the plurality of keys being associated with a respective electronic component of the computing system.

12. The computing system of claim 9, wherein:
the first key is part of a key pair associated with the electronic component, the key pair including a second key, and
the metadata signature is generated by decrypting the second key based on computer code embedded in the electronic component.

13. The computing system of claim 9, wherein:
the computing system includes a plurality of subsystems and the electronic component resides on a first subsystem of the plurality of subsystems, and
the SAE requests the metadata signature in response to determining that the first subsystem is a valid subsystem of the computing system.

14. The computing system of claim 9, wherein the metadata signature is a checksum obtained by running an error-check/error-correct code on the electronic component.

15. The computing system of claim 9, wherein the first key is removed from the electronic component upon a shutdown or a reboot of the computing system.

16. The computing system of claim 9, wherein the computing system comprises a peritoneal dialysis machine or a hemodialysis machine.

17. A non-transitory computer-readable medium storing instructions that, when executed by a security authentication engine (SAE) of a computing system, cause the SAE to perform operations comprising:
receiving a metadata signature from an electronic component of the computing system;
generating first encrypted metadata based on the metadata signature received from the electronic component; and
in response to determining that the first encrypted metadata is substantially different from a first key that is associated with the electronic component and is stored in the SAE,
blocking operation of the electronic component from which the metadata signature was received; and
storing, in a permanent memory, authentication failure information and error source information associated with the electronic component.

18. The computer-readable medium of claim 17, wherein the operations further comprise:
in response to determining that the first encrypted metadata is substantially different from the first key,
determining that a subsystem associated with the electronic component is not a valid subsystem of the computing system; and
causing the computing system to enter a hold state.

19. The computer-readable medium of claim 17, wherein the first key is stored in a lookup table comprising a plurality of keys, each key of the plurality of keys being associated with a respective electronic component of the computing system.

20. The computer-readable medium of claim 17, wherein:
the first key is part of a key pair associated with the electronic component, the key pair including a second key, and the metadata signature is generated by decrypting the second key based on computer code embedded in the electronic component.

\* \* \* \* \*